Jan. 7, 1941.  W. J. FRY  2,227,540
COMBINATION COFFEE MAKER AND HOT COFFEE RETAINER
Filed Jan. 29, 1940

Inventor
William J. Fry
by James R. McKnight
his Attorney

Patented Jan. 7, 1941

2,227,540

UNITED STATES PATENT OFFICE 2,227,540

COMBINATION COFFEE MAKER AND HOT COFFEE RETAINER

William J. Fry, Chicago, Ill.

Application January 29, 1940, Serial No. 316,127

1 Claim. (Cl. 53—3)

My invention relates to a combination unit, in which drip coffee can be made, with a detachably connected insulated receiver for retaining the hot coffee for later service.

There has long been a need for a device which will retain coffee previously made in a fresh, hot condition. It has been found that constant low heating, boiling, or reheating provides a coffee with a bitter taste; such stale coffee often resulting in giving one a headache. It is among the objects of my invention to provide a device in which fresh drip coffee may be made and retained in an insulated portion of my device for later service. No laborious and annoying transfer to extraneous apparatus is necessary. All the original aroma and rich, beneficial, stimulating oils are conserved, and the coffee later served is uniformly hot, sediment free, full flavored and delicious. My device is rapid in operation, always available, economical in original cost and upkeep. Fuel is saved, and there is no stale unused coffee to throw away. My invention also contemplates such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Figure 1:
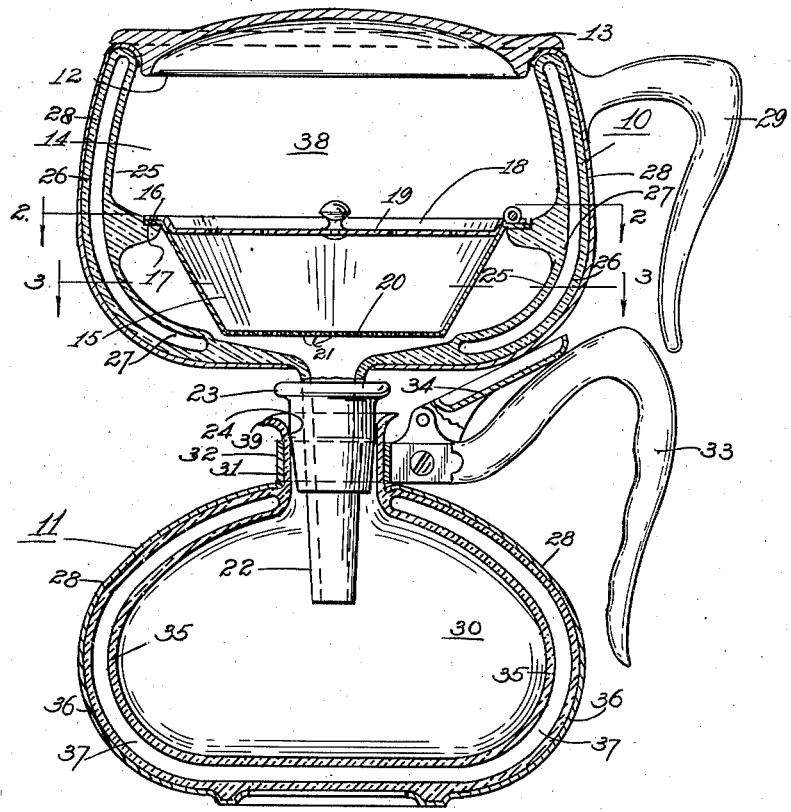
Figure 2:
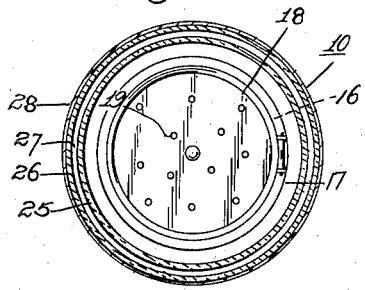
Figure 3:
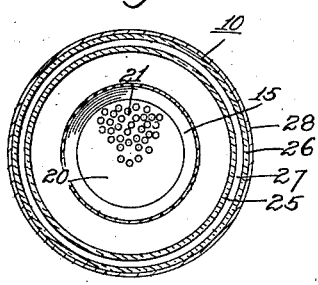
Figure 4:
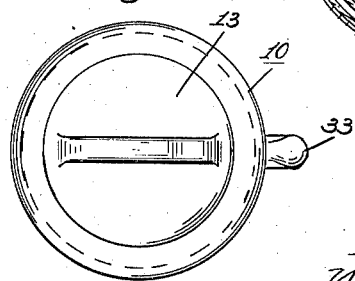

Referring to the drawing, Fig. 1 is a vertical sectional view of a combination coffee maker and hot coffee retainer embodying the features of my invention; Fig. 2 is a detailed sectional view drawn on line 2—2 of Fig. 1 on a reduced scale; Fig. 3 is a detailed sectional view drawn on line 3—3 of Fig. 1 on a reduced scale; Fig. 4 is a top plan view drawn on a reduced scale.

The embodiment selected to illustrate my invention comprises an upper coffee making portion 10 in combination with a lower coffee receiving and retaining portion 11.

The coffee making portion 10 has an open top 12 adapted to be closed by removable cover 13, and a hollow interior 14. Within the lower portion of said interior a basket 15 is removably positioned with its flange 16 on indentation 17. A top member 18 is hinged to the upper surface of flange 16. Said top member 18 has widely scattered spaced pin point openings 19. The bottom 20 of basket 15 has a plurality of closely spaced holes 21. Extending below the lower portion of my coffee maker 10 is an integral downwardly extending funnel 22. The funnel 22 has a ring 23 of softer material at its upper outer portion to contact the opening 24 of the lower coffee receiving portion 11 when the funnel 22 is placed therein in normal operating position.

My coffee making portion 10 has inner glass walls 25 and outer glass walls 26 separated by an air space 27. A shell or covering 28 of metal, plastic or any suitable material covers outer glass walls 26. This construction extends downwardly to funnel 22. A handle 29 is attached to shell 28.

The coffee receiving and retaining portion 11 has a hollow interior 30 of substantially the same size as the hollow interior 14 of coffee making portion 10. Hollow interior 30 extends upwardly and inwardly to a narrowed opening 24 of sufficient size to snugly receive ring 23 of funnel 22 which extends down into hollow interior 30. Around the neck 31 which surrounds opening 24 is a band 32 which extends outwardly for attachment to a handle 33. A cap 34 is hinged to the handle 33 and is so positioned that when funnel 22 is removed from coffee receiver 11 the cap 34 may be swung to close opening 24.

The coffee receiving and retaining portion 11 has inner glass walls 35 and outer glass walls 36 separated by an air space 37. A shell or outer covering 28 of metal, plastic or any suitable material covers outer glass walls 36.

In use coffee making portion 10 is positioned so that funnel 22 is within the interior 30 of coffee receiving and retaining portion 11. Ground coffee is placed in basket 15 and member 18 is positioned over basket 15. With the basket 15 and member 18 in position within the hollow interior 14, boiling water is poured into the water chamber 38 which is that portion of the hollow interior 14 above member 18. Cover 13 is then placed over open top 12 to close the same. The boiling water drips slowly down through pin point openings 19 in member 18 and passes down through the ground coffee, forming liquid coffee. The liquid coffee then drops down through holes 21 in the bottom of the basket 15 into funnel 22 and by means of funnel 22 into coffee receiving portion 11.

The insulated coffee maker 10 has retained the boiling water at a high temperature during the making of the coffee. The insulated coffee receiver 11 now becomes a hot coffee retainer. Coffee maker 10 may be lifted out of coffee retainer 11 by use of handle 29. Cap 34 is swung over opening 24 and coffee retainer 11 is sealed. Hot coffee may be served for hours by merely swinging cap 34 to open position and with the use of handle 33 pouring the hot coffee out of lip 39 on the outer edge of opening 24.

Having thus described my invention, I claim:

A device of the class described comprising an upper member for making hot coffee having insulated walls forming a hollow interior, said walls having an integral inwardly extending portion located substantially above the bottom of the upper member, a coffee making basket having a flange supported on said inwardly extending portion, said basket so removably supported being positioned above the bottom of the upper member and otherwise spaced from its side walls, said upper portion having a funnel continuing from the bottom of its hollow interior, a lower hot coffee retaining member having a narrow open top and insulated walls forming a hollow interior, said funnel, adapted to fit within said open top and extend down into the hollow interior of said lower member for the passage thereto of coffee made in the upper member and a handle attached to the upper member so that said upper member may be removed with its coffee making basket from contact with said lower member after coffee made in the upper member has been received by the lower member, a handle attached to said lower member, and a closure for the open top of said lower member.

WILLIAM J. FRY.